United States Patent [19]

Miyasho

[11] Patent Number: 4,592,035
[45] Date of Patent: May 27, 1986

[54] INFORMATION SIGNAL TRACK SEARCH SYSTEM IN A ROTARY RECORDING MEDIUM REPRODUCING APPARATUS

[75] Inventor: Yasuo Miyasho, Yokohama, Japan

[73] Assignee: Victor Company of Japan, Ltd., Japan

[21] Appl. No.: 419,033

[22] Filed: Sep. 16, 1982

[30] Foreign Application Priority Data

Sep. 18, 1981 [JP] Japan .................................. 56-147241

[51] Int. Cl.$^4$ ............................................ G11B 21/08
[52] U.S. Cl. ...................................... 369/32; 358/342; 358/907; 360/78
[58] Field of Search ...................... 360/78; 369/30, 32, 369/33, 41, 43, 126, 128; 358/907, 342

[56] References Cited

U.S. PATENT DOCUMENTS

| | | | |
|---|---|---|---|
| 4,106,058 | 8/1978 | Romeas et al. ................... | 360/78 X |
| 4,375,091 | 2/1983 | Dakin et al. ........................... | 369/32 |
| 4,375,094 | 2/1983 | Kelleher et al. ................. | 369/126 X |
| 4,412,319 | 10/1983 | Taylor et al. .......................... | 369/43 |
| 4,428,074 | 1/1984 | Abe et al. ............................... | 369/32 |
| 4,437,180 | 3/1984 | Takeuchi .......................... | 369/33 X |
| 4,480,280 | 10/1984 | Sugiyama et al. ..................... | 369/43 |

FOREIGN PATENT DOCUMENTS

| | | |
|---|---|---|
| 2843555 | 4/1980 | Fed. Rep. of Germany . |
| 3104539 | 2/1982 | Fed. Rep. of Germany . |
| 3137564 | 4/1982 | Fed. Rep. of Germany . |
| 2369379 | 1/1979 | France . |
| 2409572 | 6/1979 | France . |

OTHER PUBLICATIONS

Journal of the SMPTE, "A Review of the MCA Disco-Vision System", Jul. 1974, vol. 83, by Kent D. Broadbent, pp. 554–559.

Primary Examiner—Raymond F. Cardillo
Assistant Examiner—Steven R. Garland
Attorney, Agent, or Firm—Andrus, Sceales, Starke & Sawall

[57] ABSTRACT

An information signal track search system in a rotary recording medium reproducing apparatus comprising a reproducing transducer having a cantilever provided with a reproducing element and being resiliently supported at a part in the vicinity of a rear end thereof, and a moving circuit for moving the reproducing transducer along a radial direction of the rotary recording medium, comprises, a detecting circuit for detecting that the reproducing element has reached a desired set track position, a movement stopping circuit for stopping the movement of the moving circuit according to an output of the detecting circuit, where the reproducing element lags the rear end of the reproducing transducer while being moved by the moving circuit due to frictional force between the rotary recording medium and receiving a force urging further advancement along the moving direction due to a restoration force of the cantilever after being stopped by the movement stopping circuit, and a forcibly moving circuit for applying a force to the reproducing element for forcibly moving the reproducing element in a direction opposite to the moving direction after the reproducing element is stopped by the movement stopping circuit, to finally move the reproducing element to the desired set track position.

6 Claims, 8 Drawing Figures

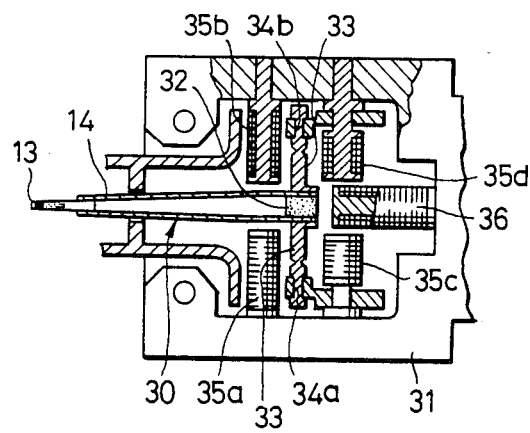
FIG. 2
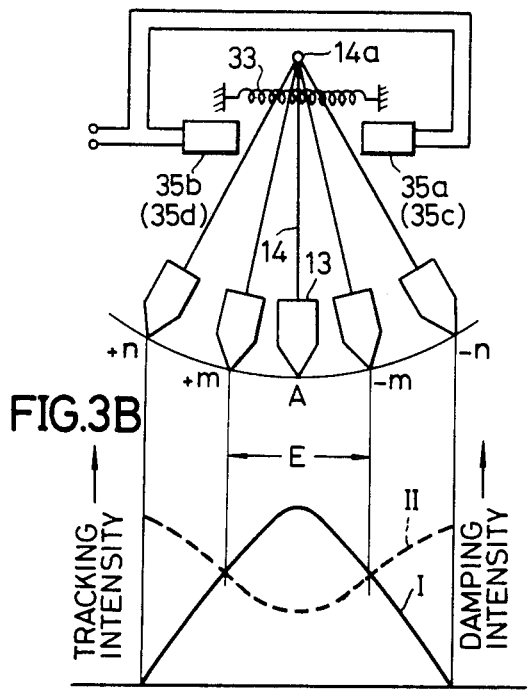
FIG. 3A
FIG. 3B

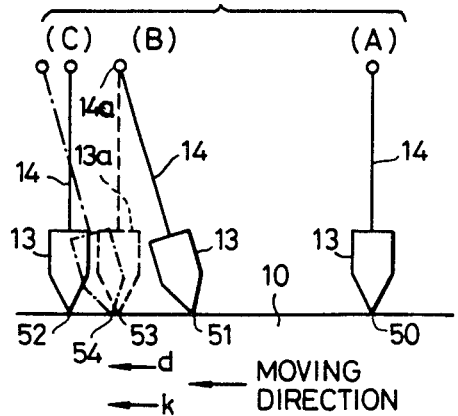
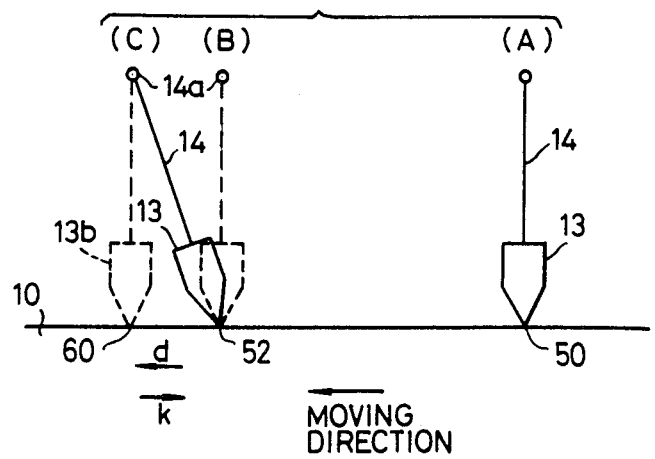

INFORMATION SIGNAL TRACK SEARCH SYSTEM IN A ROTARY RECORDING MEDIUM REPRODUCING APPARATUS

BACKGROUND OF THE INVENTION

The present invention generally relates to information signal track search systems in rotary recording medium reproducing apparatuses, and more particularly to a system capable of quickly searching for a desired information signal track position on a rotary recording medium which is to be reproduced.

Rotary recording medium reproducing apparatuses of the so-called electrostatic capacitance system are being reduced to practical use. In such an apparatus, a recorded information signal is reproduced from a rotary recording medium (hereinafter simply referred to as a disc) which is recorded with an information signal such as a video signal and an audio signal as variations in geometrical configuration, according to variations in electrostatic capacitance between the disc and an electrode of a reproducing stylus which reproduces the disc.

The above disc is recorded with a main information signal such as the video signal and the audio signal, and reference signals for tracking control. The reference signals are recorded on the disc so that the reproducing stylus correctly scans over the main information signal track.

Guide grooves for guiding the reproducing stylus are not formed in the above disc. Hence, it is possible to forcibly move the reproducing stylus along the radial direction of the disc in a state where the reproducing stylus makes sliding contact with the surface of the disc. Accordingly, besides the usual normal reproduction, it is possible to carry out various special reproduction or the so-called trick-play such as still-picture reproduction, slow-motion reproduction, high-speed reproduction, and high-speed position search. The high-speed position search in particular is carried out by moving a reproducing transducer provided with the reproducing stylus to a position in the vicinity of the desired track position on the disc from a resting position, at a super-high speed in the range of 2000 times the moving speed upon normal reproduction (2000-times-speed), for example. Thereafter, the search is completed by moving the reproducing transducer to the desired track position at a high-speed in the range of 64 times the moving speed upon normal reproduction (64-times-speed), for example. The numerical value of the multiple speed (times-speed) indicates the moved quantity of the reproducing stylus with respect to the tracks for one revolution of the disc.

The reproducing stylus of the reproducing transducer is provided at the tip end of a cantilever. The rear end part of this cantilever is supported by a resilient support member. Thus, during the above super-high-speed search, the tip end of the reproducing stylus assumes a position lagging the fulcrum of the cantilever along the moving direction, due to the friction between the reproducing stylus and the disc. As a result, the cantilever becomes inclined by a certain angle along the moving direction.

Conventionally, when searching for a desired track, the super-high-speed movement of the reproducing transducer is stopped at the point in time when an address preceding that of the desired track is reproduced, and thereafter, the reproducing transducer was moved to the desired track at a high-speed which is slower than the super-high-speed.

However, at the point in time when the above super-high-speed movement of the reproducing transducer is stopped, the direction along which a compensation damping force (restoration force) of the resilient support member is applied to the cantilever, is the same as the direction of the high-speed search movement to the desired track. Hence, in the above conventional system, the above compensation damping force and the search movement force are added, and an overrun in which the reproducing stylus moves past the desired track is easily introduced due to the added force. Therefore, it becomes necessary to carry out a high-speed search in order to return the reproducing stylus by a quantity corresponding to the overrun quantity. Thus, there was a disadvantage in that additional time was required to search for the desired track because of the above high-speed search necessary to return the reproducing stylus.

SUMMARY OF THE INVENTION

Accordingly, it is a general object of the present invention to provide a novel and useful information signal track search system in a rotary recording medium reproducing apparatus, in which the above described disadvantages have been overcome.

Another and more specific object of the present invention is to provide an information signal track search system in which the super-high-speed movement of a reproducing transducer is stopped after the address of a desired track is reproduced, and a reproducing element is moved by a quantity corresponding to the quantity by which the reproducing element moved past the desired track due to the stopping of the super-high-speed movement beyond the desired track, in a direction opposite to the super-high moving direction of the reproducing element, at a speed slower than the super-high speed. According to the system of the present invention, the direction of a compensation damping force applied to the reproducing element when the super-high-speed movement is stopped, becomes opposite to the direction of the search for the desired track. Thus, a braking force acts with respect to the movement to the desired track. It is therefore possible to quickly search for the desired track, because the reproducing element will not overrun the desired track.

Still another object of the present invention is to provide an information signal track search system which carries out the search in a state where tracking control is performed with respect to the high-speed search. According to the system of the present invention, the desired track can be searched quickly and accurately.

Other objects and further features of the present invention will be apparent from the following detailed description when read in conjunction with the accompanying drawings.

BRIEF DESCRIPTION OF THE DRAWINGS

FIG. 2 is a plan view showing an essential part of a reproducing transducer in the reproducing apparatus shown in FIG. 1;

FIG. 3A is a general plan view showing the displacement state of a cantilever of the reproducing transducer shown in FIG. 2, and FIG. 3B is a diagram showing the relationships between the displacement of the cantilever and the intensities of the tracking and damping;

FIG. 5 is a general plan view showing the displacement states of the cantilever according to the information signal track search system of the prior art;

FIG. 6 is a general plan view for explaining the displacement states of the cantilever according to the information signal track search system of the present invention.

DETAILED DESCRIPTION

Figure 1:
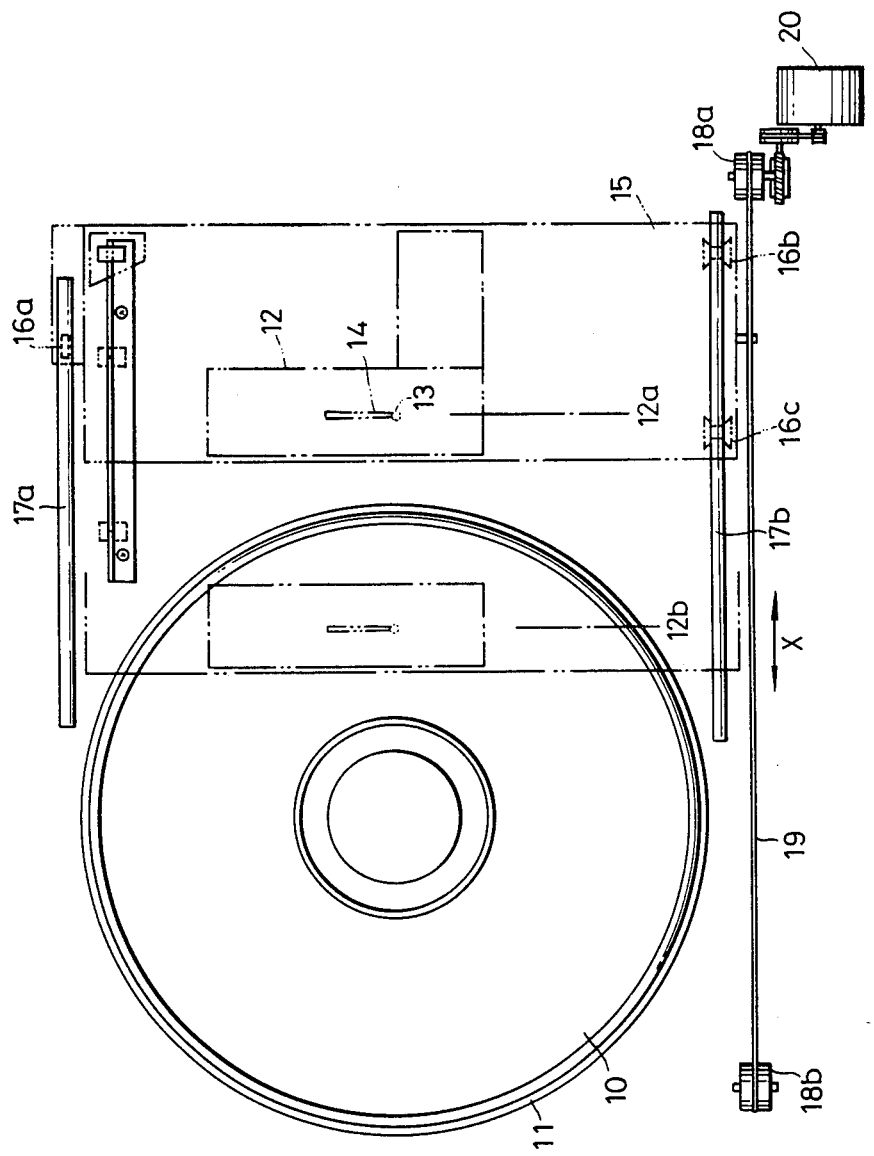
FIG. 1 is a general plan view showing a disc reproducing apparatus to which an information signal track search system according to the present invention may be applied.

In FIG. 1, a disc 10 is placed onto a turntable 11 and rotated therewith. A reproducing transducer 12 comprises a pickup device including a cantilever 14 which is provided with a reproducing stylus 13 at the tip end thereof, a resonator (not shown), and the like, and is mounted on a carriage 15. Rollers 16a, 16b, and 16c are provided on both sides of the carriage 15. The roller 16a rolls over a rail 17a, and the rollers 16b and 16c respectively roll over a rail 17b. Hence, the carriage 15 moves in the direction of an arrow X. A wire 19 is stretched across pulleys 18a and 18b. The carriage 15 is mounted on the wire 19. The pulley 18a rotates as a motor 20 rotates, and the wire 19 is accordingly moved in the direction of the arrow X. As a result, the carriage 15 is moved in the direction of the arrow X.

In FIG. 2, the reproducing transducer 12 substantially comprises a fixed coil mount 31 to which a cartridge 30 and a coil group are mounted. The above cartridge 30 comprises the cantilever 14, the reproducing stylus 13, and a permanent magnet 32. A resilient support member (damper) 33 made of rubber, is fitted onto the rear end of the cantilever 14. The cartridge 30 having the above described construction is assembled within a case, by pushing and inserting both arm parts of the damper 33 into cutouts 34a and 34b of the case.

The coil mount 31 is fixed to a housing, and is mounted with tracking control coils 35a, 35b, 35c, and 35d and a jitter compensation coil 36. Axis of the above coils 35a, 35b, 35c, and 35d are arranged along a direction perpendicular to the energizing direction of the permanent magnet 32.

When a current having a level and direction in accordance with a tracking error signal flows through the above coils 35a, 35b, 35c, and 35d, mutually different magnetic fields are introduced at end surfaces of opposing coils. Hence, a repulsive force is introduced on one hand and an attractive force is introduced on the other, between the magnetic field of the permanent magnet 32. The cantilever 14 is thus displaced by a predetermined quantity in a direction to be correct the tracking error, along a direction perpendicular to the longitudinal direction of the cantilever 14 (that is, along the radial direction of the disc 10).

A general idea of the displacement state of the cantilever 14 along the radial direction of the disc 10, is shown in the plan view of FIG. 3A. Relationships between the displacement of the cantilever 14 and the intensities of the tracking and damping, are shown in FIG. 3B. In FIG. 3A, a range between +n and −n indicates a range wherein the tracking direction of the cantilever 14 can be deviated. In this range, the cantilever 14 makes contact with the tracking coil 35, and is subjected to control of its displacement. A range E between +m and −m indicates a range wherein the reproducing stylus 13 is subjected to tracking control and is displaced. When the tracking control is carried out, the reproducing stylus 13 is displaced in the vicinity of the center of the range E (corresponding to 32 tracks, for example) between +m and −m, in a state where a fulcrum 14a is stationary. As the reproducing stylus 13 completes reproducing 32 tracks, the fulcrum 14a of the cantilever 14 is displaced along the radial direction of the disc 10 due to the movement of the carriage 15 shown in FIG. 1. Therefore, the cantilever 14 is returned to a position coinciding with a tangential direction with respect to the reproducing track.

In FIG. 3B, as shown by a curve I, the tracking intensity (the magnitude of the reproduced signal level which is reproduced according to the reproducing position of the reproducing stylus 13) is maximum in the vicinity of the center of the range E wherein the tracking control is carried out with respect to the reproducing stylus 13. This tracking intensity becomes smaller as the track which is being reproduced by the reproducing stylus 13 moves towards the radial direction of the disc with respect to the fulcrum 14a of the cantilever 14. On the other hand, as shown by a curve II, the damping intensity (the restoration force of the cantilever 14 towards a center position A by the damper 33) is minimum at the center position A, and becomes larger as the position of the cantilever 14 separates from the center position A.

Figure 4:
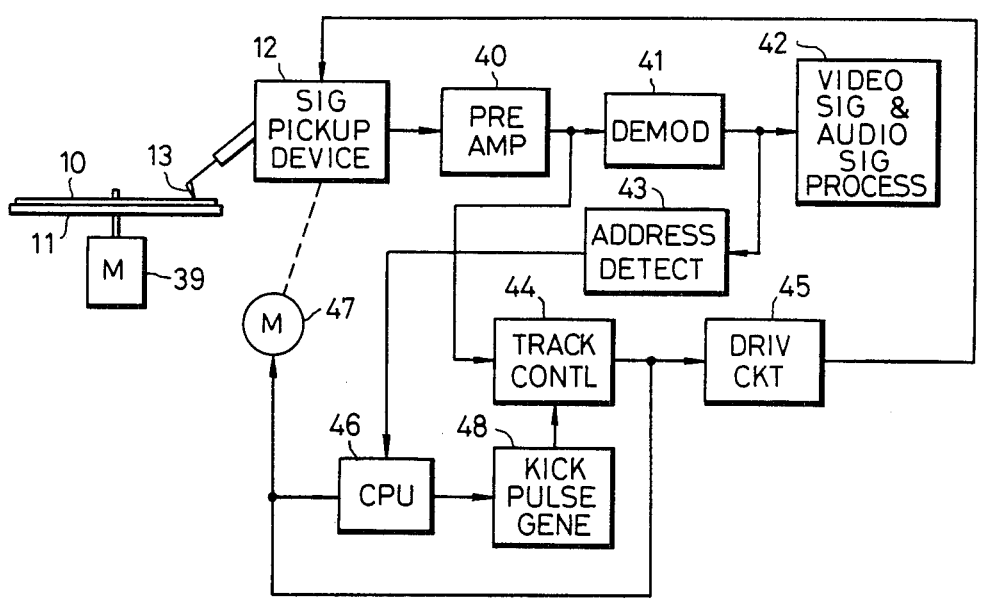
FIG. 4 is a systematic block diagram showing an embodiment of an information signal track search system according to the present invention.

Next, description will be given with respect to the operation of the reproducing apparatus. In FIG. 4, a signal is reproduced from the disc 10 which is placed onto the turntable 11 and rotated by a motor 39, by the reproducing stylus 13. The reproduced signal is passed through a preamplifier 40, and then supplied to a demodulator 41 wherein the signal is demodulated. The demodulated signal is supplied to a video signal and audio signal processing circuit 42 and an address detecting circuit 43. The output signal of the preamplifier 40 is also supplied to a tracking control circuit 44. The tracking control circuit 44 compares levels of reference signals for tracking control having mutually different frequencies and provided on both sides of a main information signal track, by a differential amplifier. Hence, the tracking control circuit 44 produces a tracking error signal having a level in accordance with the tracking error quantity and a polarity in accordance with the direction of the tracking error. The tracking error signal is converted into a predetermined voltage at a driving circuit 45, and then supplied to tracking control coils provided in the reproducing transducer 12. Accordingly, the reproducing stylus 13 is displaced within the range E shown in FIG. 3A, and the tracking error is corrected.

Next, description will be given with respect to the method of the high-speed position search. When a desired track to be reproduced is set, the address of the desired track is stored into a central processing unit (CPU) 46. An address on the disc 10 is detected at the address detecting circuit 43, and supplied to the CPU 46 wherein the supplied address indicating the present track position of the reproducing stylus 13 is compared with the stored address of the desired track and the error between these addresses are calculated. If the address comparison error is large, a motor control signal is supplied to a feed motor 47 from the CPU 46, to move the reproducing transducer 12 to a position in the vicinity of the desired track at a super-high speed in the order of 2000 times the moving speed upon normal reproduction, for example, by the rotation of the feed motor 47.

Description will now be made with respect to a conventional information signal track search system. If the reproducing stylus 13 undergoes a high-speed search to search for a desired track 52 while reproducing a track 50, for example, the reproducing stylus 13 is moved at the above super-high speed until the reproducing stylus 13 reproduces an address of a track 51 which is several hundred to several thousand tracks preceding the desired track 52 as shown in the state B in FIG. 5. In this case, the tracking control is not carried out. Accordingly, as shown in FIG. 5 at B, the reproducing stylus 13 is moved in a state where the tip end thereof is lagging the fulcrum 14a along the moving direction (direction of the arrow) due to the friction between the disc 10. Therefore, the cantilever 14 becomes inclined by a certain angle in the moving direction.

The inclination of the cantilever 14 at this instant is greater than the displacement at the position $+m$ (or $-m$) shown in FIG. 3A. Thus, several tens of tracks exist between the track 51 which is being reproduced by the reproducing stylus 13 and a reproducing track 53 of a restored reproducing stylus 13a shown by a dotted line. At this instant, a compensation damping force indicated by an arrow d is applied to the cantilever 14 at the fulcrum 14a, so that the cantilever 14 assumes a position along the tangential direction with respect to the reproducing track on the disc 10, that is, along the moving direction. After reproducing the address from the track 51, a signal is obtained from the CPU 46 so as to move the reproducing transducer 12 at a speed 600 times that upon normal reproduction, for example, and the reproducing transducer 12 is accordingly moved at the above speed which is 600 times the moving speed upon normal reproduction.

If the difference between the desired track address stored in the CPU 46 and the reproduced track address becomes in the order of several hundred tracks, for example, a kick pulse control signal is supplied to a kick pulse generator 48 from the CPU 46. A kick pulse obtained from the kick pulse generator 48 is supplied to the tracking control circuit 44. The above kick pulse is multiplexed with the tracking error signal at the tracking control circuit 44, and the tracking coils of the reproducing transducer 12 are kicked and moved to the desired track 52 at a high speed in the order of 64 times the speed upon normal reproduction, for example. During this high-speed kicking movement, measures are taken so that the tracking control operation is carried out.

However, in the above conventional search system, the direction of the compensation damping force (in the direction of the arrow d) which is applied to the cantilever 14 at the instant when the above super-high-speed movement is stopped, is the same as the direction of the search movement (in the direction of an arrow k) to the desired track 52. Accordingly, the above compensation damping force and the search movement force are added, and the reproducing stylus 13 is more likely to overrun the desired track 52 due to the added force.

On the other hand, if the reproducing stylus 13 is moved to the track 54 which is preceding the desired track 52 by several tens of tracks, for example, at the super-high speed and the search to the desired track 52 is carried out thereafter at the high speed by the kick pulse, the compensation damping force and the search movement force are added as in the above described case, and the reproducing stylus 13 is more likely to overrun the desired track 52, as shown by a one-dot chain line in state C in FIG. 5.

Accordingly, in the above described conventional system, a high-speed search becomes necessary to carry out a high-speed search in order to return the reproducing stylus by a quantity corresponding to the overrun quantity. Thus, there was a disadvantage in that several seconds were required to search for the desired track 52 because of the above high-speed search necessary to return the reproducing stylus.

Accordingly, in the system according to the present invention, the reproducing stylus is moved in a manner described hereinafter, in order to overcome the above described disadvantages of the conventional system.

Figure 7:
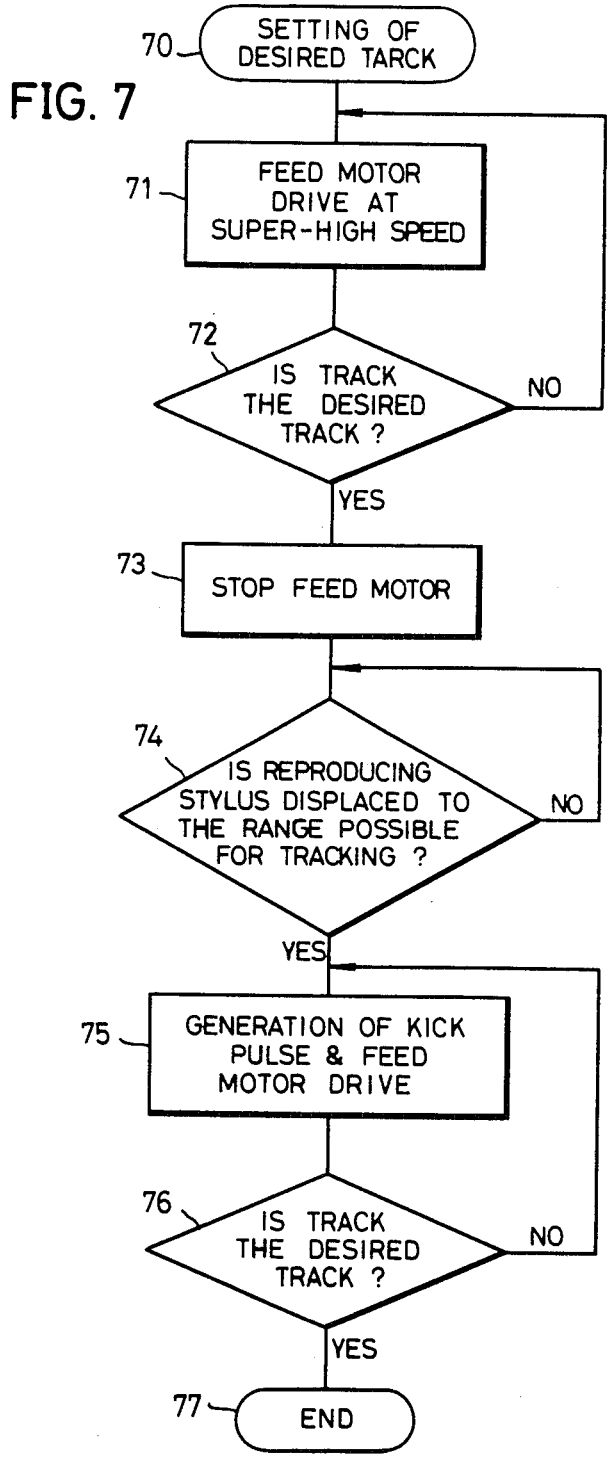
FIG. 7 is a flowchart for explaining the operation of the information signal track search system according to the present invention.

In FIG. 6 state A, the position of the desired track 52 is searched while the reproducing stylus 13 reproduces the track 50. In FIG. 7, the desired track is set at a step 70. At a succeeding step 71, a feed motor driving signal is obtained by a command signal from the CPU shown in FIG. 4. Accordingly, the reproducing transducer 12 is moved to the desired track 52 from the track 50 at a super-high speed in the order of 2000 times the moving speed upon normal reproduction, for example. In this case, measure is taken so that the tracking control is not carried out. The address signals corresponding to each of the tracks reproduced by the reproducing stylus 13 are supplied to the CPU 46, and as indicated by a step 72 shown in FIG. 7, these address signals are compared with an address signal corresponding to the set desired track 52. A signal according to the resulting error obtained by the comparison, is thus obtained. The feed motor 47 is driven by a quantity according to this error signal.

As shown in FIG. 6 at B, when the reproducing stylus 13 reproduces the desired track 52, a feed motor drive stopping signal is obtained from the CPU 46. As a result, the feed motor 47 is stopped as indicated by a step 73 in FIG. 7, and the super-high-speed movement of the reproducing transducer 12 is stopped. Because the reproducing transducer 12 is moving at the super-high speed, the reproducing transducer 12 does not stop instantaneously when the above stopping signal is obtained, and stops at a position slightly beyond the desired track 52 in the direction of the arrow due to inertia. The inclination of the cantilever 14 at this position becomes as shown by a solid line in FIG. 6 at B. As described above in conjunction with FIG. 3A, this inclination is larger than the displacement at $+m$ (or $-m$). In this case, several tens of tracks exist between the track which is being reproduced by the reproducing stylus 13 and a reproducing track 60 which is reproduced by a reproducing stylus 13b indicated by a dotted line which is being restored.

After the desired track is reproduced and the reproducing transducer 12 is stopped, the cantilever 14 is displaced towards the track 60 shown in FIG. 6 at C along the moving direction, about the fulcrum 14a. As a result, the cantilever 14 enters within the range E, that is, within the range wherein the tracking control with respect to the reproducing stylus 13 can be carried out.

As indicated by a step 74 in FIG. 7, the CPU 46 compares the stored address of the desired track 52 and the address of the track reproduced by the reproducing stylus 13 which is displaced by the compensation damping force.

By the above comparison of the addresses, the CPU 46 produces a kick pulse generation command signal when the CPU 46 detects that the cantilever 14 is restored within the above range E. Accordingly, as indicated by a step 75 in FIG. 7, a kick pulse is obtained from the kick pulse generator 48, and supplied to the tracking control coils of the reproducing transducer 12. The reproducing stylus 13 is kicked and moved by the above kick pulse, and reaches the desired track 52. The compensation damping force is acting on the cantilever 14 even after the cantilever 14 enters within the above range E, and the cantilever 14 is displaced towards the desired track 52 by the kick pulse while the compensation damping force is acting thereon.

The address of the desired track and the address of the track being reproduced by the reproducing stylus 13, are constantly compared at the CPU 46. As the reproducing stylus 13 approaches the desired track 52, the speed of the high-speed search is gradually decreased to 64, 16, 4, and 2 times the moving speed upon normal reproduction, for example. During this search at the high speed, the feed motor 47 is driven by the tracking error signal from the tracking control circuit 44, as indicated by the step 75 shown in FIG. 7. Hence, the reproducing transducer 12 is moved in the direction of the arrow k, and the cantilever 14 is displaced to the center position indicated by a dotted line in FIG. 6 at B.

In FIG. 7, when the reproducing stylus 13 reproduces the address of the desired track at a step 76, the search operation is completed as indicated by a step 77.

That is, according to the present embodiment of the invention, the direction along which the compensation damping force is applied to the cantilever 14 (direction of the arrow d) after the super-high-speed movement is stopped due to the reproduction of the desired track 52, is opposite to the direction of the kick search movement (direction of the arrow k) towards the desired track 52. For this reason, a braking force is applied with respect to the movement to the desired track 52. In addition, this braking operation is carried out within the range E shown in FIGS. 3A and 3B wherein the tracking control can be carried out.

Therefore, the reproducing stylus 13 is subjected to the above braking with respect to the force along the kick search moving direction. Hence, the reproducing stylus 13 will not overrun the desired track 52. Moreover, because the tracking control is carried out during the search, the desired track 52 can be searched accurately. Accordingly, it is not necessary to carry out a search to correct the quantity corresponding to the overrun quantity, as in the case shown in FIG. 5 at A through C. The time required for the search is shorter than that of the case shown in FIG. 5 at A through C (several tens of milliseconds, for example), and it is possible to realize a high-speed position search of a shorter duration.

Furthermore, according to the present embodiment of the invention, the cantilever 14 does not become excessively inclined with respect to the disc surface, because the above braking. Hence, the resistance of the reproducing stylus 13 with respect to the disc surface is small.

In addition, the position where the super-high-speed movement of the reproducing transducer 12 is stopped, may be a position whereat the address of a track located several tracks beyond the desired track 52 is reproduced, besides the position in the above described embodiment whereat the address of the desired track 52 is reproduced.

Further, the present invention is not limited to these embodiments, but various variations and modifications may be made without departing from the scope of the present invention.

What is claimed is:

1. An information signal track search system in a rotary recording medium reproducing apparatus comprising carriage means, a reproducing transducer mounted on said carriage means and having a cantilever, said cantilever being provided with a reproducing element at a tip end thereof for scanning over tracks on a rotary recording medium and reproducing recorded signals from the tracks, said cantilever being resiliently supported at a part in the vicinity of a base end thereof so that said reproducing element is displaceable with respect to the base end of said cantilever, and driving means for moving the carriage means along a radial direction of the rotary recording medium, said rotary recording medium being recorded with an address signal indicating the position of each track, said track search system comprising:
    address detecting means for constantly detecting the address signal from the signals reproduced by the reproducing element so as to detect an address of a track on which the reproducing element is located;
    processing means for comparing a desired address of a desired track memorized therein and the detected address from said address detecting means and for controlling said driving means responsive to an address difference, said processing means controlling said driving means to move the carriage means in a first radial direction at a first high speed in response to said address difference, said processing means controlling said driving means to stop driving the carriage means in said first radial direction when said address difference becomes substantially equal to zero, said reproducing element lagging with respect to the base end of said cantilever due to friction between the reproducing element and the surface of the rotary recording medium while said carriage means moves in said first radial direction and, when said carriage means is no longer driven, said reproducing element undergoing a further movement in said first radial direction and overrunning said desired track owing to inertia of said carriage means and a resilient restoration force of said cantilever acting to overcome the lagging condition of said reproducing element; and;
    kicking means for kicking the reproducing element in a second radial direction which is opposite to said first radial direction at a second high speed until said address difference becomes exactly equal to zero, said second high speed being smaller than said first high speed.

2. A track search system as claimed in claim 1 in which said rotary recording medium is recorded with reference signals for tracking control and which said reproducing element is displaceable within a first predetermined range with respect to said base end and is subject to tracking control within a second predetermined range smaller than said first predetermined range, said rotary recording medium reproducing apparatus further comprising tracking control means for carrying out a tracking control by moving the reproducing element responsive to the reference signals reproduced by the reproducing element, and said tracking control means is deactivated when said reproducing element is outside said second predetermined range and is activated when said reproducing element is within said second predetermined range.

3. A track search system as claimed in claim 2 in which said tracking control means controls said driving means to move said carriage means in said second radial direction when said cantilever assumes the state where said reproducing element is within said second predetermined range.

4. A track search system as claimed in claim 1 in which said first high speed is approximately equal to 2000 times the moving speed of the carriage means at the time of a normal reproducing mode of the rotary recording medium reproducing apparatus, and said second high speed is approximately equal to 64 times the moving speed of the reproducing element at the time of the normal reproducing mode.

5. A track search system as claimed in claim 1 in which said second high speed is gradually decreased as said address difference becomes smaller.

6. A track search system as claimed in claim 1 in which said reproducing element locates on the track slightly exceeding the desired track along the first radial direction by several tracks from the desired track when said processing means causes said driving means to stop driving the carriage means moving in said first radial direction.

* * * * *